United States Patent
Kroczek et al.

(10) Patent No.: US 12,291,855 B2
(45) Date of Patent: May 6, 2025

(54) WATER VALVE ASSEMBLY

(71) Applicant: Goodrich Corporation, Charlotte, NC (US)

(72) Inventors: Piotr Kroczek, Dolnośląskie (PL); Agata Kurowska-Kalińska, Kowale (PL); Dariusz Sapija, Kielczowek (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/831,931

(22) Filed: Jun. 3, 2022

(65) Prior Publication Data

US 2022/0412061 A1 Dec. 29, 2022

(30) Foreign Application Priority Data

Jun. 28, 2021 (EP) ..................................... 21461560

(51) Int. Cl.
*E03B 7/10* (2006.01)
*E03B 7/07* (2006.01)

(52) U.S. Cl.
CPC .................. *E03B 7/10* (2013.01); *E03B 7/07* (2013.01); *F16K 2200/402* (2021.08); *Y10T 137/1244* (2015.04); *Y10T 137/5762* (2015.04)

(58) Field of Classification Search
CPC ... E03B 7/10; E03B 7/12; E03B 9/025; E03B 9/027; Y10T 137/1244; Y10T 137/1353; Y10T 137/5762; F16K 5/0605; F16K 2200/40; F16K 2200/402
See application file for complete search history.

(56) References Cited

U.S. PATENT DOCUMENTS

| | | | | |
|---|---|---|---|---|
| 965,772 A * | 7/1910 | Walker | .................. | F16K 5/0605 |
| | | | | 137/625.22 |
| 1,672,393 A * | 6/1928 | William | .................... | E03B 7/10 |
| | | | | 73/277 |
| 3,101,740 A * | 8/1963 | Ray | ........................ | F16K 5/0605 |
| | | | | 251/315.13 |
| 5,158,105 A * | 10/1992 | Conway | ................ | F16K 11/044 |
| | | | | 137/302 |
| 8,327,867 B2 * | 12/2012 | Caleffi | ...................... | E03B 7/12 |
| | | | | 137/79 |
| 9,234,333 B2 * | 1/2016 | Ko | ............................ | E03B 7/12 |
| 10,968,610 B2 * | 4/2021 | Modica | ................... | E03B 9/027 |

(Continued)

FOREIGN PATENT DOCUMENTS

| | | |
|---|---|---|
| CN | 104455624 A | 3/2015 |
| CN | 112413205 A | 2/2021 |
| JP | S5294233 U | 7/1977 |

OTHER PUBLICATIONS

Machine translation of CN 104455624.*

(Continued)

*Primary Examiner* — Kevin F Murphy
(74) *Attorney, Agent, or Firm* — CANTOR COLBURN LLP

(57) ABSTRACT

A valve assembly includes a movable valve element arranged to move relative to a valve housing between an open and a closed position. The valve housing includes a drainage body provided with drainage holes arranged to allow fluid to drain from the valve assembly from gaps between the movable valve element and the housing via the drainage holes.

8 Claims, 6 Drawing Sheets

(56) References Cited

U.S. PATENT DOCUMENTS

2019/0106863 A1* 4/2019 Toews .................... E03B 3/03
2021/0179194 A1 6/2021 Song et al.

OTHER PUBLICATIONS

Abstract CN104455624 (A), Published: Mar. 25, 2015, 1 page.
Abstract for CN112413205 (A), Published: Feb. 26, 2021, 1 page.
European Search Report for Application No. 21461560.1, mailed Dec. 17, 2021, 7 pages.

* cited by examiner

WATER VALVE ASSEMBLY

CROSS REFERENCE TO RELATED APPLICATIONS

This application claims priority to European Patent Application No. 21461560.1 filed Jun. 28, 2021, the entire contents of which is incorporated herein by reference.

TECHNICAL FIELD

The present disclosure relates to water valves and, in particular, a system for enabling water to drain from areas in the valve where water can accumulate.

BACKGROUND

Valve are used in fluid flow systems to regulate the flow of fluid through the system. Valves can be provided in flow lines to prevent flow through the valve, when closed, or to allow flow and, in some cases, to regulate the flow rate. Various types of valve are known including simple, manually operated valves, and motorised valves. Valves can be simple shut-off valves or differential valves. Valves are commonly used in water systems such as sanitation systems. A known problem with water valves is that there will usually be some small gaps between the various valve components where water can accumulate. Even though valves are commonly provided with seals where valve parts connect, there is still the potential for water to collect in valve spaces. In some environments, e.g. in aircraft water systems, or other cold environments, water that has collected in such spaces can freeze and prevent valve parts from moving as required or otherwise cause damage to the valve. Spaces between valve parts can also allow the ingress of debris which can also damage the valve. Valve designers therefore aim to design valves with as few water gaps as possible or even to eliminate space between the valve components. This requires very accurate machining and can be complex and costly to manufacture such valves.

There is, therefore, a need for a simple, inexpensive valve design that allows accumulated water to effectively drain away from the water gaps in the valve as well as to prevent debris getting into the valve.

SUMMARY

According to the disclosure, there is provided a valve assembly comprising a movable valve element arranged to move relative to a valve housing between an open and a closed position, the valve housing including a drainage body provided with drainage holes arranged to allow fluid to drain from the valve assembly from gaps between the movable valve element and the housing via the drainage holes.

According to another aspect, there is provided a water system incorporating such a valve system.

BRIEF DESCRIPTION

Preferred embodiments will now be described by way of example only, with reference to the drawings.

DETAILED DESCRIPTION

Figure 1:
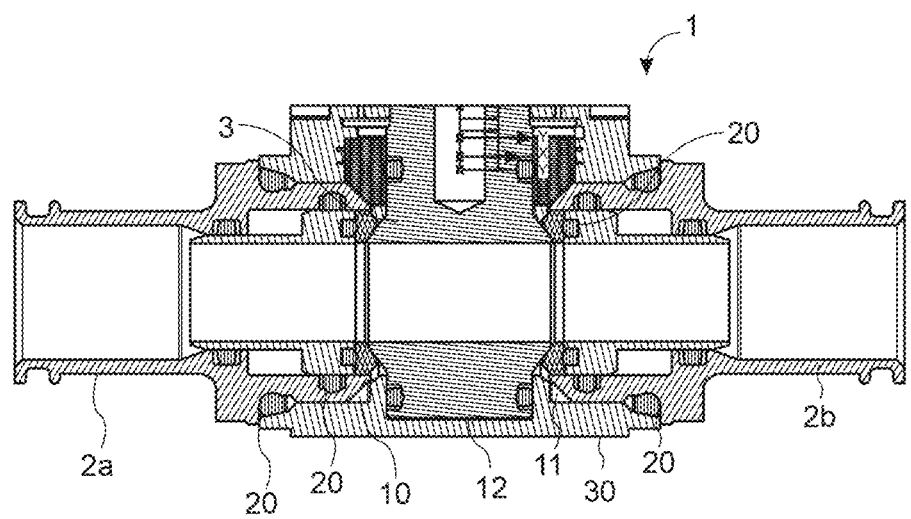
FIG. 1 is a side view of an example water valve shown for explanatory purposes.

Referring first to FIG. 1, the problems which the valve of this disclosure aims to address will be described.

FIG. 1 shows a water valve 1 in a flow line 2a, 2b of a water system. In an open state, the valve allows water to flow through flow paths defined by lines 2a and 2b, via the open valve 1. If the valve is closed, water cannot flow between parts 2a and 2b. Because the valve includes a moveable valve part 3, there will be gaps 10, 11, 12 between the movable and fixed valve parts. Although seals 20 are provided between the valve parts, some water will still leak into these gaps and can accumulate there until the valve is disassembled or removed for maintenance. In some cases, this accumulated water can freeze and cause damage to the valve.

Figure 2A:
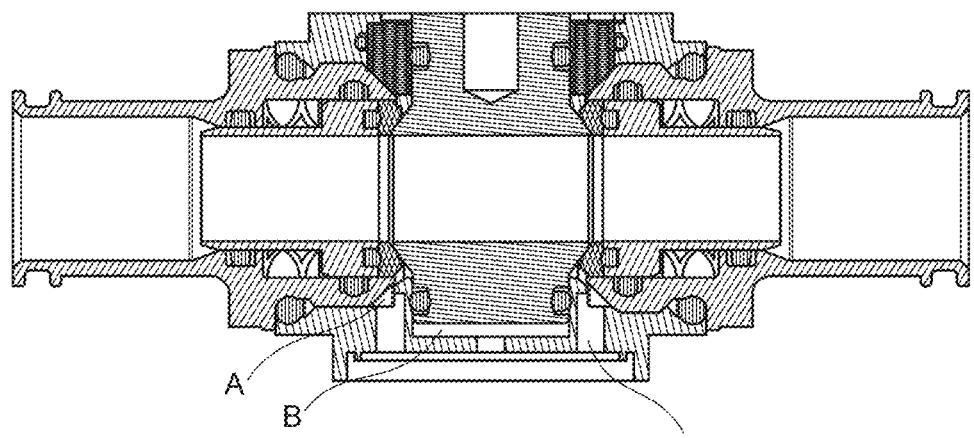
FIG. 2A shows a side view of a valve modified according to this disclosure.
Figure 2B:
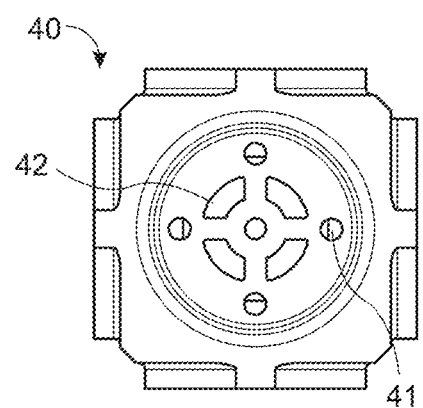
FIG. 2B shows a bottom view of the valve of FIG. 2A.

The valve of the present disclosure replaces part of the valve housing 30, that includes the water gaps 10, 11, 12, with a drainage body 40 as shown in FIGS. 2A and 2B. The draining body is provided with holes 41, 42 that align with the water gaps 10, 11, 12. More specifically, holes 41 align with water gaps 10 and 11 and holes 42 align with water gap 12. Instead of the water accumulating in the water gaps, it is, therefore, able to drain away from the valve via the holes 41, 42 in the drainage body 40.

Figure 3:
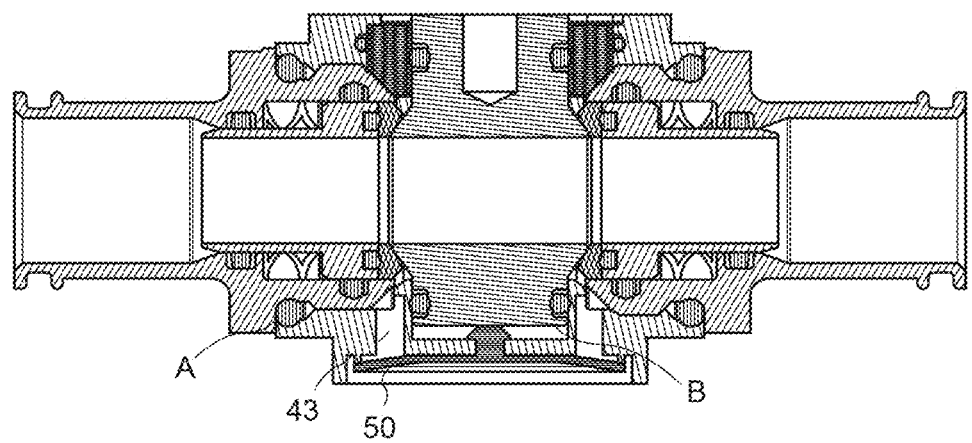
FIG. 3 shows a further modified valve according to the disclosure.

In a preferred arrangement, however, the drainage body is further modified to prevent dirt and pollution from entering the valve via the holes 41, 42 in the drainage body. This is provided by means of a flexible washer 50 that is mounted across the drainage body to cover the holes but still to allow water drainage from the water gaps as described further below. As shown in FIG. 3, the washer 50 is provided in the inside of the drainage body between the holes and the valve parts.

Figure 4A:
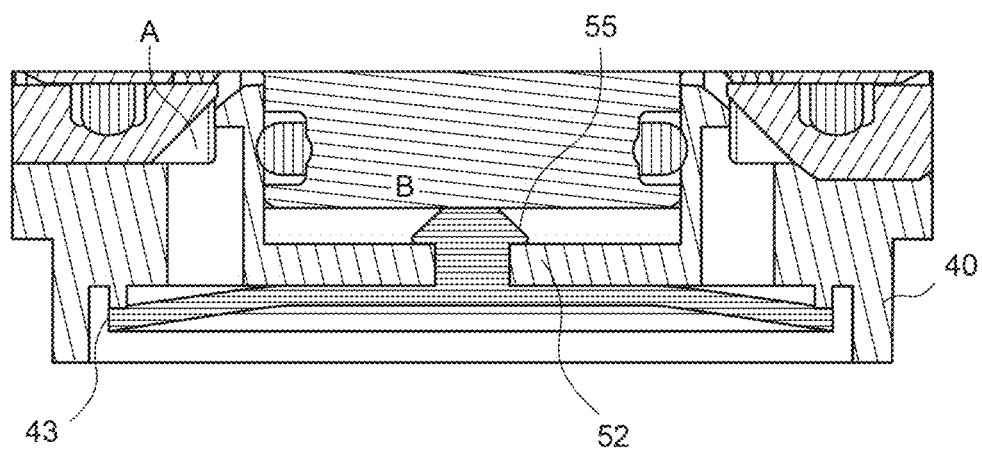
FIG. 4A shows a detail of the valve of FIG. 3
Figure 4B:
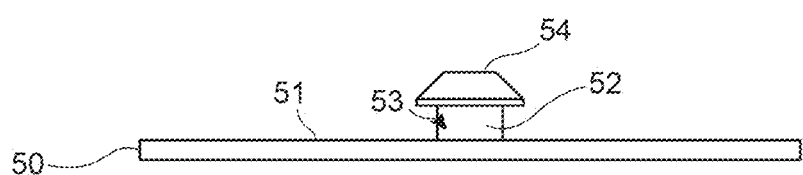
FIG. 4B shows the washer of FIG. 4A.

The washer should be flexible so that it can be deformed by pressure. An example washer is shown, in its flat or undeformed state, in FIG. 4B. The washer in this example comprises a washer body 51 dimensioned to fit across the drainage body 40, and a connector part 52 extending from the washer body and configured to secure to the valve to hold the washer in place. An example connector part, as shown in FIG. 4B, comprises a stem 53 and a head 54 shaped to be retained in a groove 55 of the part of the drainage body 40 inside the valve.

In this example, the washer, which may be made of rubber or other flexible material such as plastic, is assembled into the drainage body by pushing the head 54 into the groove 55. The washer body 51, in its flat state, lays over the holes of the drainage body.

The drainage body may also be provided with a wall extension 43 extending down and pressing against the perimeter of the washer body when the washer is assembled to ensure that the washer is held tightly in place as shown in FIG. 3 and its outer edge is compressed by the wall to prevent the ingress of dirt or pollution.

Figure 5:
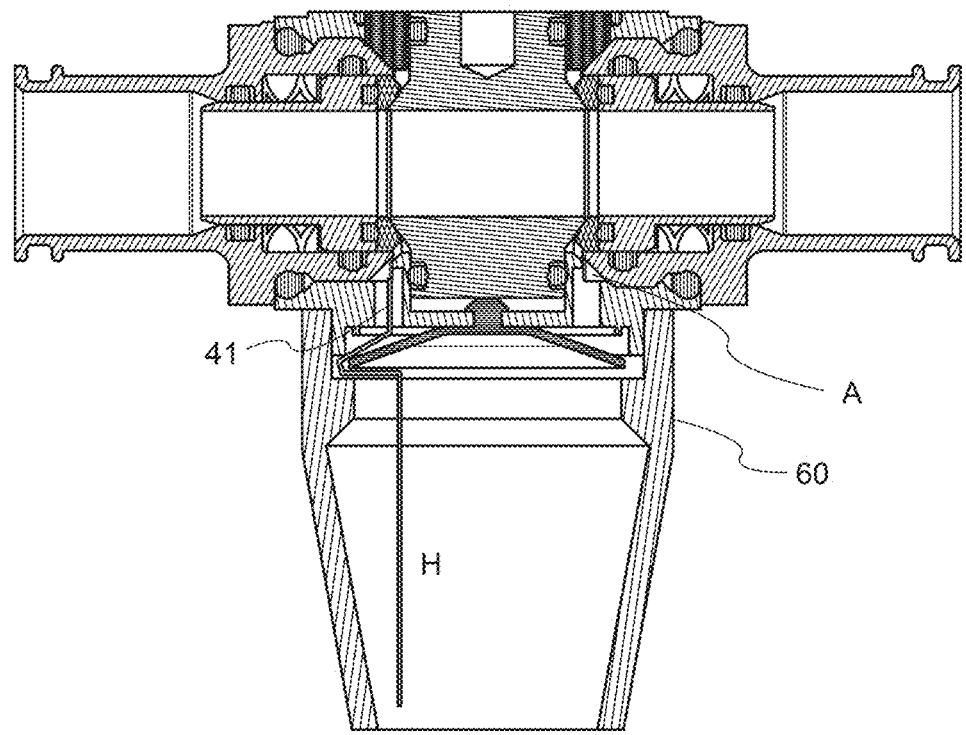
FIG. 5 shows a side view of a further example of a valve according to the disclosure.

When water accumulates in the water gaps 10, 11, 12, the higher water pressure on the valve side of the washer causes the washer to deform (this position is not shown in FIG. 4 but can be seen in FIG. 5, which includes additional preferred features that will be described further below). If, in the embodiments shown in FIGS. 3 and 4A, the washer 40 is deformed such that the outer perimeter of the washer body is forced downwards relative to the connector part 52, a flow passage is formed between the water gaps and the holes 41, 42 allowing water to drain out of the holes. The drained water can be drained to the environment.

In some applications, however, it is not feasible to merely drain water from the valve into the environment around the valve if, for example, the valve is located in an environment that may be damaged by water, such as an environment containing electrics or materials that should not get wet. In aircraft water systems, for example, the water drained from the valve via the holes of the drainage body cannot, for safety reasons, merely be ejected to the valve environment.

For such applications, the valve of this disclosure can be further modified as shown in FIGS. 5 to 10.

Figure 6:
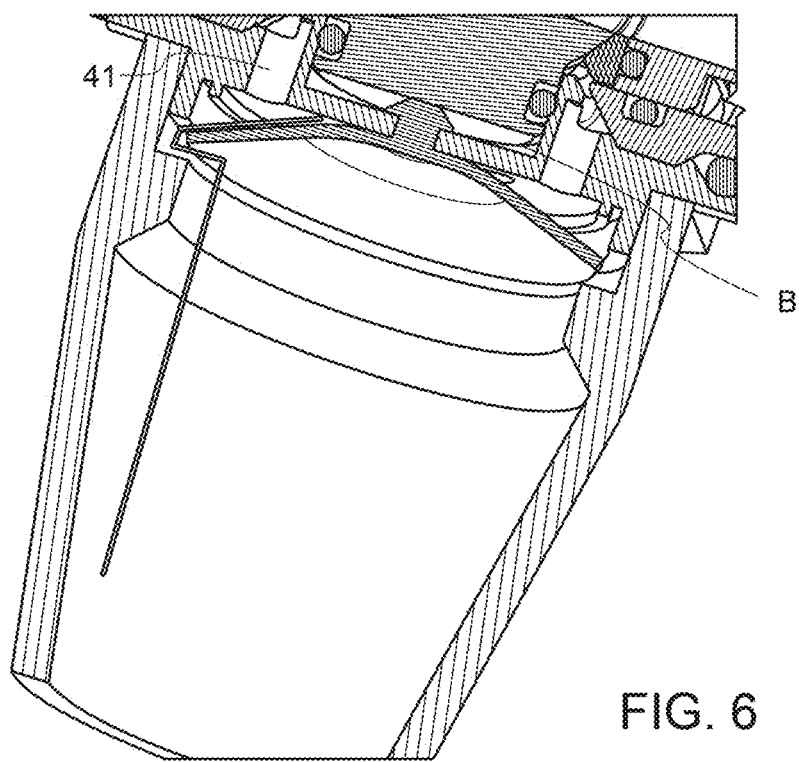
FIG. 6 shows part of the valve of FIG. 5 in more detail.

As explained above, when the washer is deformed, water can flow from gaps 10, 11 out of the valve via holes 41 in the drainage body 40 and water from gap 12 can flow through holes 42 in the drainage body. If it is desired not to let the drained water flow directly into the environment, the valve can be further modified by attaching a drainage pipe 60 around and extending from the drainage body 40 as shown in FIGS. 5 and 6 to contain the drained water and guide it to a location from where it can be safely drained away or ejected without causing damage to the valve's direct environment. The drainage pipe 60 preferably has a tapered shape so that the water drains naturally along the pipe. Water drained from water gaps 10, 11 via holes 41 flows along the path marked H in FIG. 5. Water drained from water gaps 12 via holes 42 is drained along the path marked I in FIG. 6.

Figure 7:
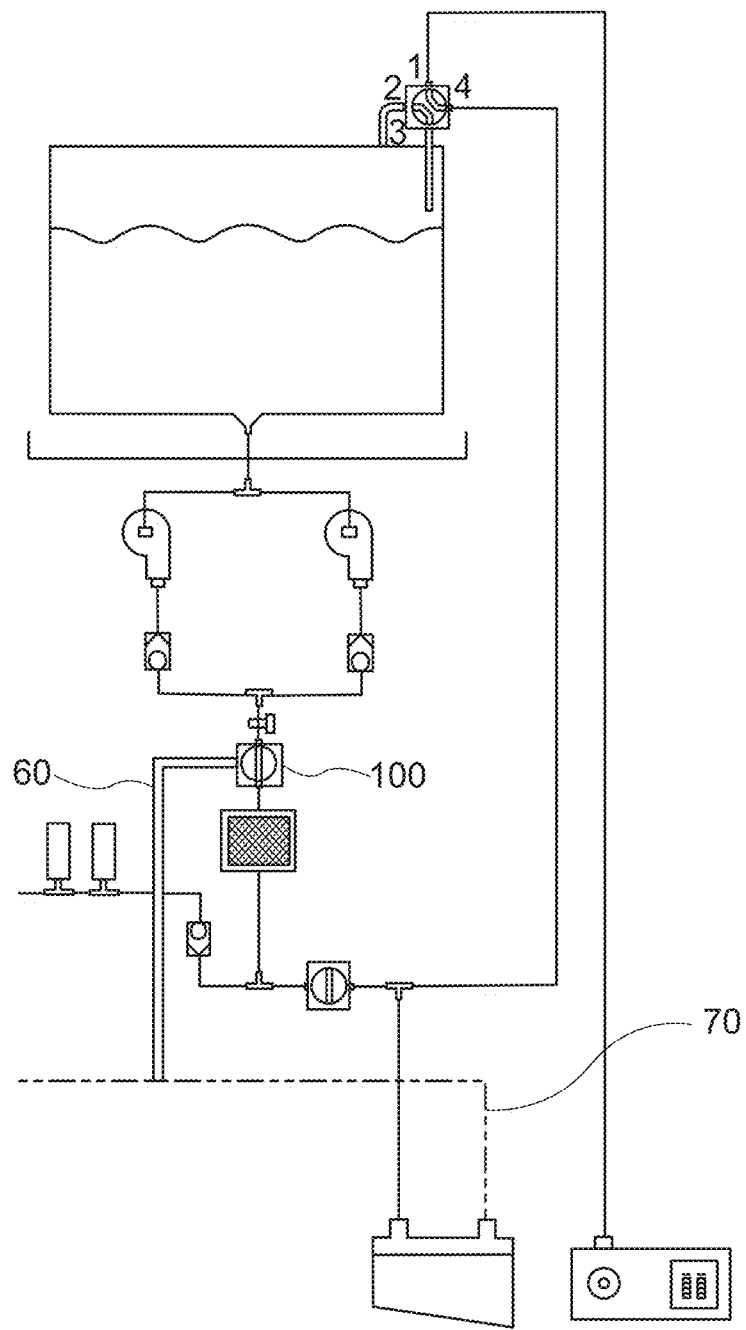
FIG. 7 shows a schematic view of a water system in which a valve according to the disclosure may be incorporated.
Figure 8:
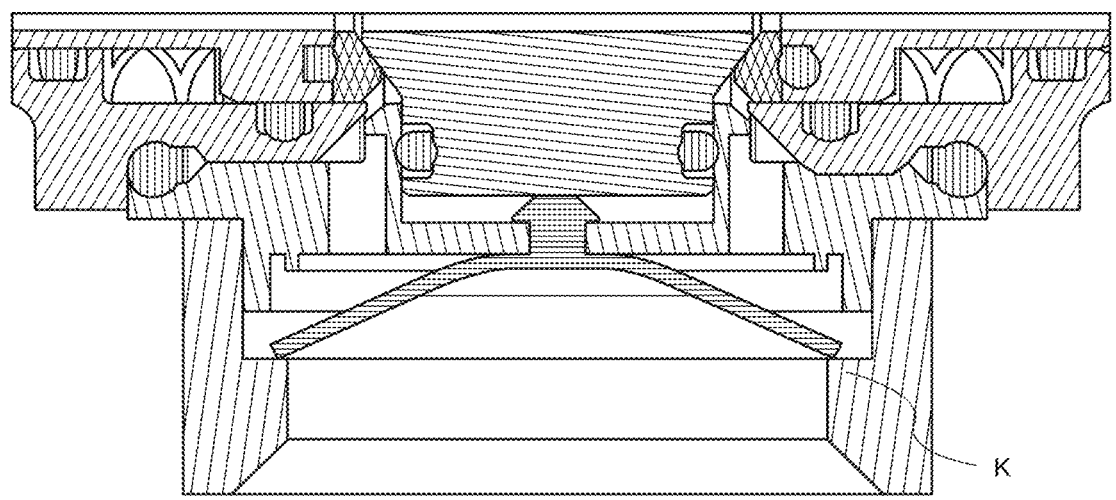
FIG. 8 shows a further detail of a valve such as shown in FIGS. 3 to 6.
Figure 9:
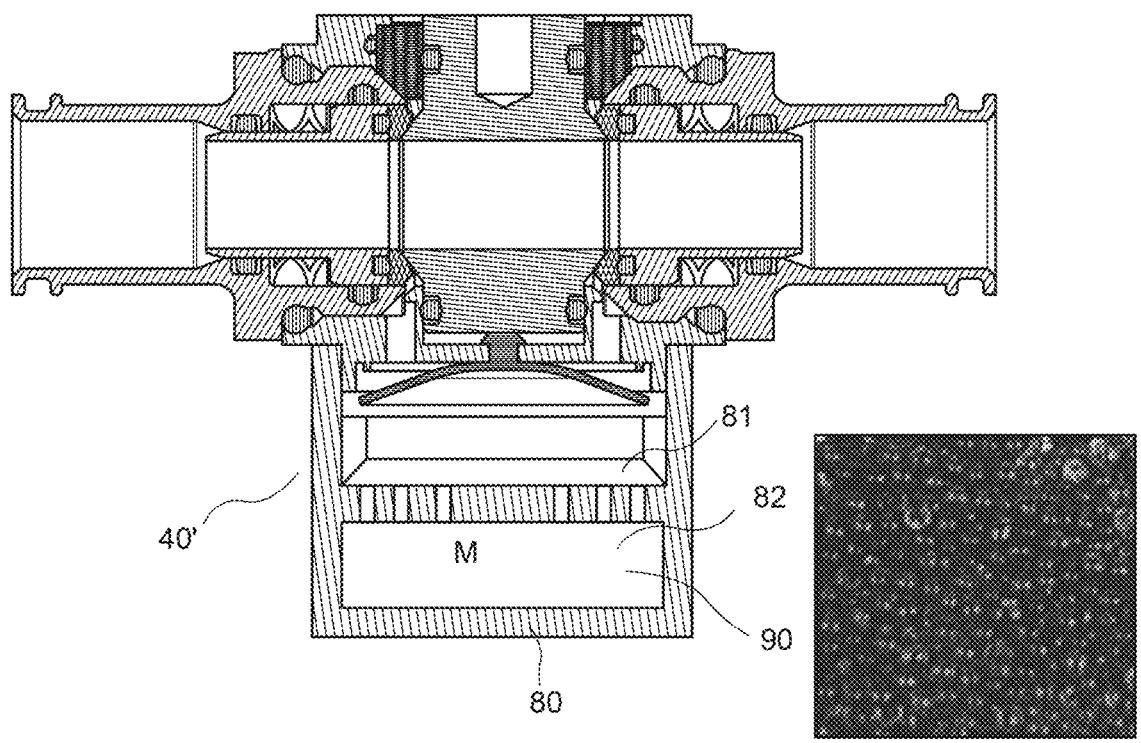
FIG. 9 shows a further example of a valve according to the disclosure.
Figure 10:
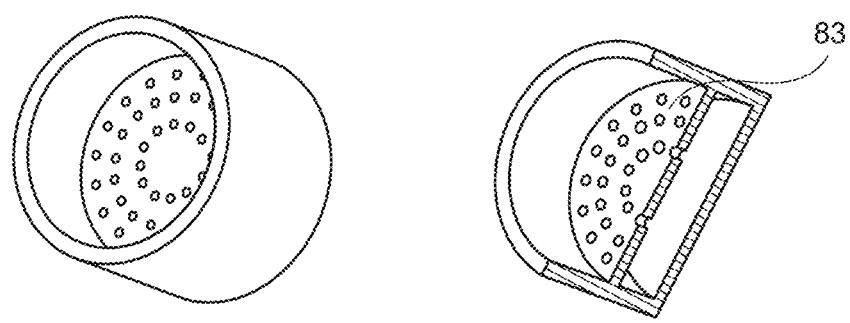
FIG. 10 shows a detail of the valve of FIG. 9.

This drainage system can be seen, by way of example, in FIG. 7, in the context of a water system that will not be described in detail. In this example, the modifications of this disclosure are applied to an isolation valve 100. Water is drained via a drainage pipe 60 and can then be directed into the main drain line 70 of the system from where it is ejected. In the event of system or valve failure, there is a risk that an underpressure can be generated in the drainage pipe 60 which can act directly on the valve. To avoid the negative effects of this, the washer 40 may be configured to further deflect in the event of such an underpressure, as shown in FIG. 8 to seal the area marked as K in FIG. 8.

In some applications, it may not be feasible to drain the water off at all, in that it may not be possible to drain the water directly into the environment or via a drainage pipe. An alternative solution is therefore shown in FIGS. 9 and 10. Instead of a drainage pipe as described above. The drainage body 40' may be terminated by a container 80 which collects the drained water at a location away from the valve parts. At an appropriate time, e.g. during valve maintenance, the container can then be removed and emptied. In another example, the container may be filled with hygroscopic material 90 that absorbs the drained water. In one example, the container 80 is divided into two chambers 81, 82 separated by a perforated divider 83. The water drained from the water gaps enters the first chamber 81 and then passes through the holes in the divider 83 into the second chamber 82 that may contain the hygroscopic material.

The various examples of the valve, described above, are only some examples of the disclosure. Variations are possible within the scope of the claims.

The valve according to the disclosure has the effect of eliminating the negative effect of water gaps in the valve using a simple, inexpensive solution that is easy to manufacture and assemble.

The invention claimed is:

1. A valve assembly comprising:
   a valve housing; and
   a movable valve element arranged to move relative to the valve housing between an open and a closed position;
   wherein the valve housing includes a drainage body provided with drainage holes arranged to allow fluid to drain from the valve assembly from gaps between the movable valve element and the housing via the drainage holes;
   wherein the drainage body includes a container to contain fluid flowing from the drainage holes;
   wherein the container contains a material for absorbing the drained fluid.

2. The valve assembly of claim 1, wherein the container is a removable container.

3. The valve assembly of claim 1, further comprising a washer with a flexible washer body dimensioned to cover the drainage holes.

4. The valve assembly of claim 3, the valve housing further comprising:
   a wall for compressing an outer edge of the washer body to prevent ingress of debris into the valve.

5. A water system including:
   a water supply;
   a water tank;
   a water line between the water supply and the water tank; and
   a valve assembly as claimed in claim 1, located in the water line, to regulate flow of water from the water supply to the water tank.

6. A water system including:
   a water tank;
   a water outlet;
   a water line between the water tank and the water outlet; and
   a valve assembly as claimed in claim 1, located in the water line, to regulate flow of water from the water tank to the water outlet.

7. The valve assembly of claim 1, wherein the container comprises:
   a first chamber to receive the fluid;
   a second chamber containing the material; and
   a perforated divider between the first and second chambers.

8. The valve assembly of claim 1, wherein the fluid is water and the material is a hygroscopic material.

* * * * *